United States Patent
Oliverio

(10) Patent No.: US 9,228,501 B2
(45) Date of Patent: Jan. 5, 2016

(54) BLEED VALVE OVERRIDE SCHEDULE ON OFF-LOAD TRANSIENTS

(71) Applicant: Solar Turbines Incorporated, San Diego, CA (US)

(72) Inventor: Fabrizio Oliverio, Moltrasio (IT)

(73) Assignee: Solar Turbines Incorporated, San Diego, CA (US)

( * ) Notice: Subject to any disclaimer, the term of this patent is extended or adjusted under 35 U.S.C. 154(b) by 491 days.

(21) Appl. No.: 13/714,888

(22) Filed: Dec. 14, 2012

(65) Prior Publication Data

US 2014/0165583 A1    Jun. 19, 2014

(51) Int. Cl.
| | |
|---|---|
| F02C 9/18 | (2006.01) |
| F02C 9/52 | (2006.01) |
| F04D 27/02 | (2006.01) |
| F02C 6/08 | (2006.01) |

(52) U.S. Cl.
CPC ... *F02C 9/18* (2013.01); *F02C 9/52* (2013.01); *F02C 6/08* (2013.01); *F04D 27/0207* (2013.01); *F04D 27/0223* (2013.01); *F05D 2270/091* (2013.01); *F05D 2270/303* (2013.01)

(58) Field of Classification Search
CPC ............... F02C 9/18; F02C 9/52; F02C 1/04; F02C 1/06; F02C 6/08; F04D 27/0207; F04D 27/0223; F04D 27/0215; F23R 3/26; F05D 2270/091–2270/1024
USPC .................................................. 60/785, 795
See application file for complete search history.

(56) References Cited

U.S. PATENT DOCUMENTS

| | | | | |
|---|---|---|---|---|
| 3,584,459 | A * | 6/1971 | Amann | F02C 9/18 60/39.23 |
| 3,688,504 | A * | 9/1972 | Hutchinson | F02C 9/18 415/17 |
| 3,809,490 | A * | 5/1974 | Harner | F04D 27/023 137/625.61 |
| RE29,667 | E * | 6/1978 | Harner | F04D 224/023 137/625.61 |
| 4,102,595 | A * | 7/1978 | Wibbelsman | F04D 27/023 415/1 |
| 4,655,034 | A * | 4/1987 | Kenison | F02C 9/18 415/27 |
| 4,683,715 | A | 8/1987 | Iizuka et al. | |
| 4,864,813 | A | 9/1989 | Krukoski | |
| 4,991,389 | A * | 2/1991 | Schafer | F02C 9/18 60/39.24 |
| 5,385,012 | A * | 1/1995 | Rowe | F04D 27/0215 60/779 |

(Continued)

*Primary Examiner* — Phutthiwat Wongwian
*Assistant Examiner* — Alain Chau
(74) *Attorney, Agent, or Firm* — Finnegan, Henderson, Farabow, Garrett & Dunner, LLP

(57) ABSTRACT

In one aspect, the present disclosure is directed to a method for controlling a position of a bleed valve of a gas turbine engine. The onset of an off-load transient may be determined. Values representative of the turbine rotor inlet temperature and the exhaust outlet temperature may be determined. Also, the amount of time elapsed since the onset of the off-load transient may be determined. Three provisional bleed valve command positions may be determined based on value representative of the turbine rotor inlet temperature, the value representative of the exhaust outlet temperature, and the amount of time elapsed, respectively. The provisional bleed valve command position associated with the lowest relative value may be selected. Then, the bleed valve position may be adjusted to match the selected bleed valve command position.

14 Claims, 6 Drawing Sheets

(56) References Cited

U.S. PATENT DOCUMENTS

| | | | |
|---|---|---|---|
| 5,515,673 A * | 5/1996 | Leclerco | F04D 27/0215 60/226.3 |
| 6,328,526 B1 | 12/2001 | Seki et al. | |
| 6,442,941 B1 * | 9/2002 | Anand | F02C 7/32 60/39.182 |
| 6,543,234 B2 * | 4/2003 | Anand | F02C 7/32 60/39.182 |
| 6,779,346 B2 * | 8/2004 | Nichols | F02C 9/52 60/782 |
| 6,820,429 B2 * | 11/2004 | Meisner | F02C 9/28 60/39.27 |
| 7,647,778 B2 * | 1/2010 | Zewde | F02C 9/18 60/779 |
| 7,818,970 B2 * | 10/2010 | Price | F01D 15/10 60/39.281 |
| 8,015,826 B2 * | 9/2011 | Myers | F01K 13/02 60/782 |
| 2010/0196137 A1 * | 8/2010 | Horn | F01D 11/24 415/1 |
| 2010/0286889 A1 * | 11/2010 | Childers | F02C 6/08 701/100 |
| 2011/0044794 A1 * | 2/2011 | Ono | F01K 13/02 415/36 |
| 2011/0142602 A1 * | 6/2011 | Adhami | F01D 17/162 415/159 |

* cited by examiner

BLEED VALVE OVERRIDE SCHEDULE ON OFF-LOAD TRANSIENTS

TECHNICAL FIELD

The present disclosure relates generally to a system for controlling a bleed valve associated with a gas turbine engine and, more particularly, to a method and apparatus for setting and actuating a bleed valve when an off-load transient is detected.

BACKGROUND

Gas turbine engines (GTEs) convert potential energy associated with air and fuel into energy, primarily in the form of mechanical rotation and heat. A conventional GTE may include a compressor assembly, a combustor assembly, and a turbine assembly. During operation, air is drawn into and compressed within the compressor assembly. The combustor assembly receives the compressed air, supplies fuel thereto, and ignites and combusts the compressed fuel-air mixture. The combustion products are supplied to the turbine assembly and expanded to cause a turbine rotor to rotate, thereby producing rotational energy. The turbine assembly is typically coupled to the compressor assembly, which uses some rotational energy developed by the turbine to compress air. Further, a gas turbine engine may include a recuperator (or heat exchanger) to heat compressed air before it enters the combustor by recovering heat from the turbine exhaust. Even with such a heat exchange, the flow of compressed air reduces the temperature of the combustor assembly.

Fuel for combustion is provided by means of fuel injectors that provide both a main fuel stream and a pilot fuel stream. The main fuel stream comprises a leaner fuel-air mixture, and the pilot fuel stream comprises a richer fuel-air mixture. The main fuel stream burns more efficiently than the pilot fuel stream, producing a lower temperature flame with relatively low $NO_x$ emissions. The richer fuel-air mixture, directed to the combustor as the pilot fuel stream, burns at a higher temperature and serves to stabilize the combustion process at the cost of slightly increased $NO_x$ emissions.

Under certain conditions, a portion of the compressed air exiting the compressor assembly may be bled off before the compressed air is sent to the combustor section (and typically before such compressed air is heated by the recuperator). The compressed air bypassing the combustion process is known as bleed air, and the compressed air that is used in the combustion process is known as combustion air. Bleed air may be released by way of a bleed air valve (or bleed valve) controlled by the GTE's control system. There are various reasons for bleeding air before combustion including, for example, stabilizing combustion and controlling engine performance.

Rotation power generated by a GTE may be used to drive a load. For example, a GTE may be used to drive a power generator, and such a generator may generate large amounts (on the order of megawatts) of electrical energy, which may, for example, be provided to an electrical power grid (also known as a utility grid). A GTE driving a full (or otherwise substantial) load is considered to be in an "on-load" condition; a GTE driving no load (or a negligible load) is considered to be in an "off-load" condition; and a GTE driving a load substantially less than its full load is considered to be in a reduced load condition. Under certain circumstances, such as, if the utility grid goes offline or if the circuit breaker for the power generator is triggered, the load being driven by the GTE may drop substantially in a short period of time to an off-load or reduced load condition, perhaps to as low as 500 kilowatts or even 0 megawatts. This is known as an off-load transient. If the rotational power of the GTE is not reduced commensurate with the drop in load, the GTE may go into an overspeed state, creating potentially hazardous conditions that may damage the GTE and its surroundings.

In order to compensate for an off-load transient—and subsequent off-load or reduced load conditions—the total fuel supply to the combustor may be reduced and the ratio of pilot fuel to total fuel may be greatly increased. For example, when a GTE is driving a full load, the ratio of pilot fuel to total fuel may be approximately 2%. And, during an off-load transient, the pilot fuel ratio may increase to approximately 40%. This pilot fuel ratio increase is accomplished by both reducing the flow of main fuel into the combustor and by increasing the flow of pilot fuel. In order to avoid an overspeed state, the reduction in total fuel supply must occur rapidly in response to the commencement of an off-load transient. And in order to avoid combustion instability, the ratio change must occur rapidly in response to the commencement of an off-load transient. A high pilot fuel ratio may permit the GTE to continue to run with stable condition during the reduced load condition, thereby preventing a shut-down of the GTE. A shut-down of the GTE can be particularly problematic where a GTE located in a power plant is disconnected from the utility grid (for example, due to power transmission line failure). In such circumstances, a shut-down of the GTE could lead to a complete power supply black-out in the power plant in which the GTE is located.

The various embodiments of the present disclosure are directed toward overcoming one or more of the problems set forth above and/or other problems of the prior art.

SUMMARY

In one aspect, the present disclosure is directed to a method for controlling a position of a bleed valve of a gas turbine engine. The onset of an off-load transient may be determined. Values representative of the turbine rotor inlet temperature and the exhaust outlet temperature may be determined. Also, the amount of time elapsed since the onset of the off-load transient may be determined. Three provisional bleed valve command positions may be determined based on the value representative of the turbine rotor inlet temperature, the value representative of the exhaust outlet temperature, and the amount of time elapsed, respectively. The provisional bleed valve command position associated with the lowest relative value may be selected. Then, the bleed valve position may be adjusted to match the selected bleed valve command position.

In another aspect, the present disclosure is directed to a method for operating a gas turbine engine. An off-load transient may be detected. The total flow of fuel provided to the combustor section of the engine may be decreased in response to detecing the off-load transient. And the ratio of pilot fuel to total fuel may be increased in response to detecting the off-load transient. Then, the bleed valve may be adjusted in response to the detection of the off-load transient until either an on-load transient occurs or until the amount of time elapsed since onset of the off-load transient exceeds a maximum override time.

In yet another aspect, the present disclosure is directed to a gas turbine engine control system. The control system includes a plurality of sensors configured to gather data relating to a turbine rotor inlet temperature of a turbine section of the engine and an exhaust outlet temperature of the turbine section. It also includes a variable bleed valve configured to bleed air compressed by a compressor section and a controller in communication with the set of sensors and the bleed valve. The controller may be configured to determine the onset of an off-load transient, the onset of an on-load transient, an amount of time elapsed since onset of the off-load transient, the turbine rotor inlet temperature, and/or the exhaust outlet temperature. The controller may be also configured to determine three provisional command positions based upon the turbine rotor inlet temperature, the exhaust outlet temperature, and the time elapsed since onset of the off-load transient. Further, the controller may be configured to adjust a position of the bleed valve based on a selection of one of the first, second and third provisional command positions having the lowest relative value.

DETAILED DESCRIPTION

Figure 1:
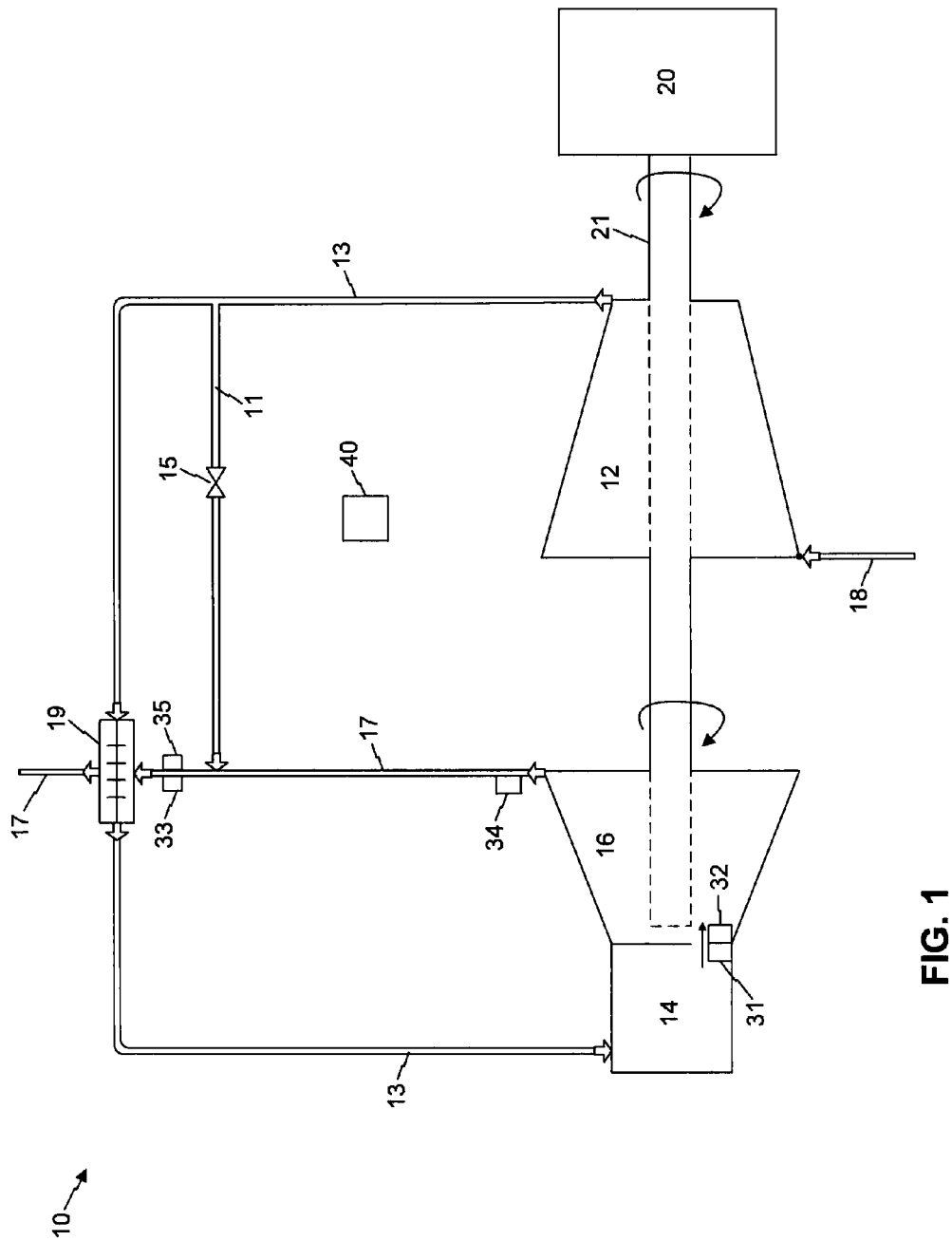
FIG. 1 is a schematic section view of the air compression and exhaust systems of an exemplary GTE in accordance with the present disclosure.

FIG. 1 illustrates an exemplary GTE 10, which may, for example, supply power to machines, such as vehicles, power generators, pumps, and/or other types of industrial or non-industrial machinery. GTE 10 may include a compressor section 12, a combustor section 14, and a turbine section 16.

Compressor section 12 may be configured to draw air into GTE 10 through an air inlet 18 and compress the air before it enters combustor section 14. Compressor section 12 may include stationary blades and rotating blades (not shown) operably coupled to a compressor hub (not shown). Stationary blades and rotating blades may be shaped such that, as the rotating blades rotate, air may be drawn into compressor section 12 and compressed before being expelled through a compressed air passage 13 fluidly connected to compressor section 12. Compressed air passage 13 may be fluidly connected to a bleed air passage 11, containing bleed valve 15.

Bleed valve 15 may be any type of flow control device known in the art. For example, bleed valve 15 may be a variable valve in that it may have intermediate positions between a fully open position (herein referenced as 100%) and a fully closed position (herein referenced as 0%). Bleed valve 15 may be controlled by a control system of GTE 10, and such a control system may include a controller 40 (connections between controller 40 and other GTE 10 elements not shown). When bleed valve 15 is partially or fully open, compressed air from compressed air passage 13 may be directed into bleed air passage 11 and, eventually, bled out of the system (typically via a turbine exhaust passage 17).

The compressed air in compressed air passage 13 may be heated by a recuperator 19 and may continue through compressed air passage 13 to a combustion chamber (not shown) of combustor section 14. Recuperator 19 may be fluidly coupled to compressed air passage 13 such that compressed air originating from compressor 12 may be directed to combustor section 14 after it is heated. Further, recuperator 19 may be fluidly coupled to turbine exhaust passage 17, which carries turbine exhaust expelled from turbine section 16. Recuperator 19 may be a heat exchanger that utilizes the hot turbine exhaust to heat the compressed air flowing through compressed air passage 13 via convective heat transfer.

Combustor section 14 may receive pilot fuel and main fuel via fuel lines, and may include fuel injectors (not shown). Combustor section 14 is also fluidly coupled to compressed air passage 13, so as to receive compressed air (which may be heated by recuperator 19). In certain embodiments, a compressed air valve may direct a portion of the compressed air to fuel injectors of combustor section 14 and direct another portion of the compressed air directly into the combustion chamber of combustor section 14. The fuel and compressed air may be directed to a combustion chamber in combustor section 14. The fuel and air mixture is combusted in the combustion chamber, yielding highly-pressurized combustion products and generating heat. The highly-pressurized combustion products may be directed to turbine section 16, which is fluidly coupled to combustor section 14.

Turbine section 16 may include stationary blades (not shown) and rotating blades (not shown) operably coupled to a turbine hub (not shown). The combustion products directed into turbine section 16 may expand and undergo a corresponding reduction in pressure as they pass through turbine section 16. Rotating blades may be configured to rotate as the combustion products expand and pass through turbine section 16, thereby generating rotational power.

After passing through turbine section 16, the combustion products may be directed into turbine exhaust passage 17, which may be fluidly coupled to turbine section 16. Bleed air passage 11 may also be configured to discharge into turbine exhaust passage 17, and the two passages may be fluidly coupled. Turbine exhaust passage 17 may direct turbine exhaust through recuperator 19, where the turbine exhaust may be used to heat compressed air in compressed air passage 13 prior to being discharged into the atmosphere (or otherwise outside of the GTE 10 system).

Compressor section 12 and turbine section 16 may be operably coupled to one another via a drive shaft 21 that rotates about a longitudinal drive axis. Turbine section 16 may rotate drive shaft 21 (via its rotating blades), and such rotation may drive compressor section 12 to compress air. Turbine section 16 may also be operably coupled to a load 20 via the drive shaft 21 for performing work. In an exemplary embodiment, load 20 represents an electrical power generator or other type of machinery that may be coupled to and powered by GTE 10. The power drain (or mechanical resistance) sustained by load 20 may be monitored by controller 40 via sensors (not shown) or another method known in the art. In conjunction with such monitoring, controller 40 may be further configured so as to determine whether GTE 10 is in an on-load, an off-load, or reduced load condition, and to detect off-load and on-load transients.

GTE 10 may further include a number of sensors. These may include turbine inlet pressure sensor 31, turbine rotor inlet temperature (TRIT) sensor 32, exhaust pressure sensor 33, exhaust temperature sensor 34, and exhaust temperature sensor 35. Turbine inlet pressure sensor 31 may be located at the inlet of turbine section 16, may be fluidly coupled to the passage between combustor section 14 and turbine section 16, and may measure the pressure of the combustion products as they enter the turbine. TRIT sensor 32 may be located at the inlet of turbine section 16, may be fluidly coupled to the passage between combustor section 14 and turbine section 16, and may measure the temperature of the combustion products as they enter the turbine. Exhaust pressure sensor 33 may be located along—and fluidly coupled to—the turbine exhaust passage 17, preferably near the inlet of recuperator 19, to measure the pressure of the exhaust exiting turbine section 16. Exhaust temperature sensor 34 may be located along—and fluidly coupled to—the turbine exhaust passage 17, preferably adjacent to turbine section 16, to measure the temperature of the exhaust exiting turbine section 16. Exhaust temperature sensor 35 may be located along—and fluidly coupled to—the turbine exhaust passage 17, preferably near the inlet of recuperator 19 and may measure the temperature of the exhaust passing through turbine exhaust passage 17.

In certain preferred embodiments, TRIT sensor 32 may be omitted. In such embodiments, TRIT may be calculated, estimated, and/or otherwise determined based on at least one of the temperature measured by exhaust temperature sensor 34 and the temperature measured by exhaust temperature sensor 35. For example, TRIT may be estimated by taking the temperature at exhaust temperature sensor 34 and adjusting it based upon the pressure drop across the turbine, as measured by turbine inlet pressure sensor 31 and exhaust pressure sensor 33.

In other embodiments, the exhaust temperature sensor 35 may be omitted. In such embodiments, the temperature at the inlet of the recuperator 19 along exhaust passage 17 may be calculated, estimated, and/or otherwise determined based on the temperature measured by temperature sensor 34. The estimated temperature at the inlet of the recuperator 19 is typically very similar to the temperature measured by exhaust temperature sensor 34.

The controller 40 may be configured to receive sensor measurements and make calculations based upon such sensor measurements, as discussed herein. Specifically, controller 40 may be in communication with any or all of turbine inlet pressure sensor 31, TRIT sensor 32, exhaust pressure sensor 33, exhaust temperature sensor 34, and exhaust temperature sensor 35. Further, controller 40 may direct other aspects of GTE 10 operation including the supply of pilot fuel and main fuel.

Industrial Applicability

Embodiments of the present disclosure may be used to improve or maintain GTE performance upon onset of an off-load transient, e.g., when there is a substantial and sudden reduction in power draw on a load 20, regardless of what industrial or non-industrial machinery is driven by GTE 10. In response to a detection of an off-load transient, the fuel supplied to combustor section 14 may be modified and bleed valve 15 may be controlled in accordance with a bleed valve override schedule.

Upon detection of an off-load transient, controller 40 of GTE 10 may cause a reduction in the total flow of fuel and increase the pilot fuel ratio to compensate for the reduction of load. Increasing the pilot fuel ratio and reducing the total flow of fuel may, however, result in a dramatically reduced amount of combustion, and a commensurate reduction in heat generation within the combustor section 14. This reduction in heat generation, when combined with the cooling effect of the flow of compressed air from compressor section 12 through combustor section 14, may excessively reduce the temperature in the combustor section 14, destabilizing the combustion of the fuel provided by the fuel injectors. The destabilized combustion may result in a "partial flame-out," wherein the flame of one or more fuel injectors is extinguished, or a "total flame-out," wherein all combustion within the combustor section 14 is extinguished. As a safety measure, controller 40 will typically shut down the entire GTE 10 upon detecting either a partial or a total flame-out. In other words, the combination of reduced total fuel flow and reduced temperature resulting from the off-load transient may cause a GTE shut-down.

Certain GTE 10 configurations may have an increased risk of flame-outs in response to off-load transients. For example, if a GTE 10 has a main fuel valve that closes more quickly than its pilot fuel valve opens, there may be an interval where the flow of main fuel (and thus total fuel) is reduced before the flow of pilot fuel can be adequately increased during the response to an off-load transient.

The presently disclosed bleed valve override schedule may be utilized to facilitate the safe, effective, and continuous operation of a GTE 10 during off-load transients. Use of the bleed valve override schedule upon onset of off-load transients may reduce the likelihood of partial or total flame-out, while avoiding an over-temperature condition. For example, bleeding air in response to a detection of an off-load transient reduces the flow of compressed air through the combustor section 14, thereby ameliorating the decrease in temperature that typically occurs when a GTE 10 alters the fuel supply in response to an off-load transient. This relative increase in temperature (e.g., as compared to the combustor section 14 temperature when total fuel flow is reduced without bleeding air) stabilizes combustion and greatly reduces the risk of flame-out. On the other hand, an excessive or prolonged reduction in the amount of compressed air flow might lead to an over-temperature state in the GTE, which could present potentially hazardous conditions that may damage the GTE 10 and its surroundings. The embodiments of the present disclosure may serve to prevent both flame-out and over-temperature conditions.

Figure 5:
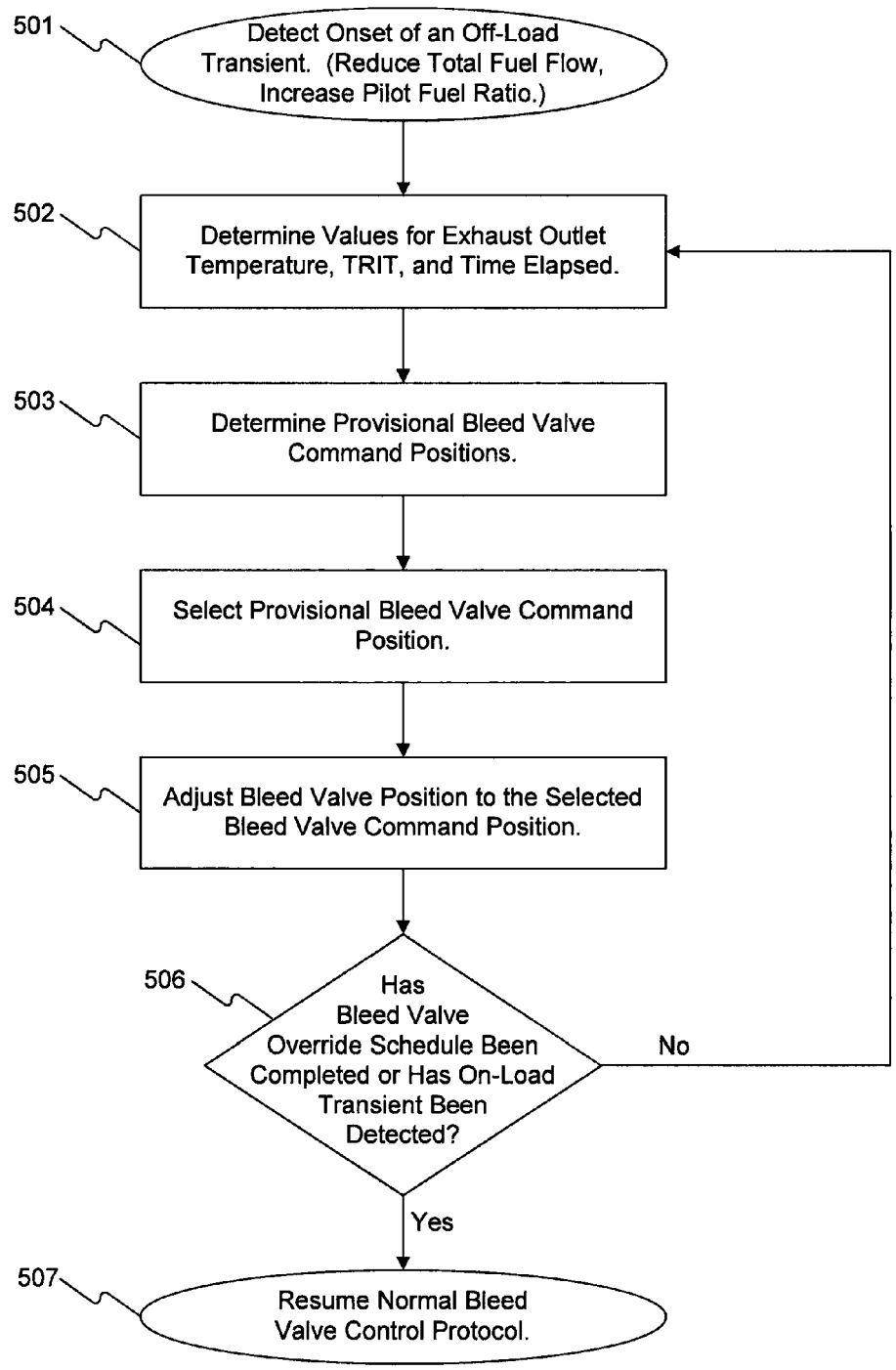
FIG. 5 is flow chart illustrating an exemplary method of operating a bleed valve override schedule, in accordance with the present disclosure.

FIG. 5 is a flow chart depicting a method of using a bleed valve override schedule according to an exemplary embodiment of the disclosure. Such a method may assist in maintaining a temperature in combustor section 14 that is adequate to reliably support combustion and prevent both flame-out and over-temperature conditions. As will be described below, in exemplary embodiments, when the load 20 being driven by a running GTE 10 is suddenly removed or substantially reduced, thereby creating an off-load transient, controller 40 of the GTE may modulate the fuel supply to the combustor section 14 so as to reduce power output in order to prevent an overspeed condition.

For example, at step 501 controller 40 may detect the onset of an off-load transient by way of monitoring the power drain sustained by load 20. In exemplary embodiments, controller 40 may monitor load 20 by scanning the power drain approximately every 30 milliseconds. And, the onset of an off-load transient may be found when controller 40 detects a drop in load that is greater than a threshold amount, for example, a drop of more than 750 kW between power drain scans. Upon detecting an off-load transient, controller 40 may reduce the supply of total fuel, increase the ratio of pilot fuel to total fuel, and initiate a bleed valve override schedule algorithm. These sub-steps may occur simultaneously or otherwise within a very small timeframe.

At step 502, controller 40 may determine values for turbine rotor inlet temperature, the exhaust outlet temperature, and the amount of time elapsed since the onset of the off-load transient (or initiation of bleed valve override schedule). As discussed above, these temperature values may be measured directly, or may be calculated from other related sensor measurements.

At step 503, controller 40 may determine the one or more provisional bleed valve command positions. For example, controller 40 may determine three provisional bleed valve command positions based upon the values for turbine rotor inlet temperature, the exhaust outlet temperature, and the amount of time elapsed since the initiation of the bleed valve override schedule, respectively. These provisional bleed valve command positions may be derived from a TRIT map, an exhaust outlet temperature map, and a time map, respectively.

Figure 2:
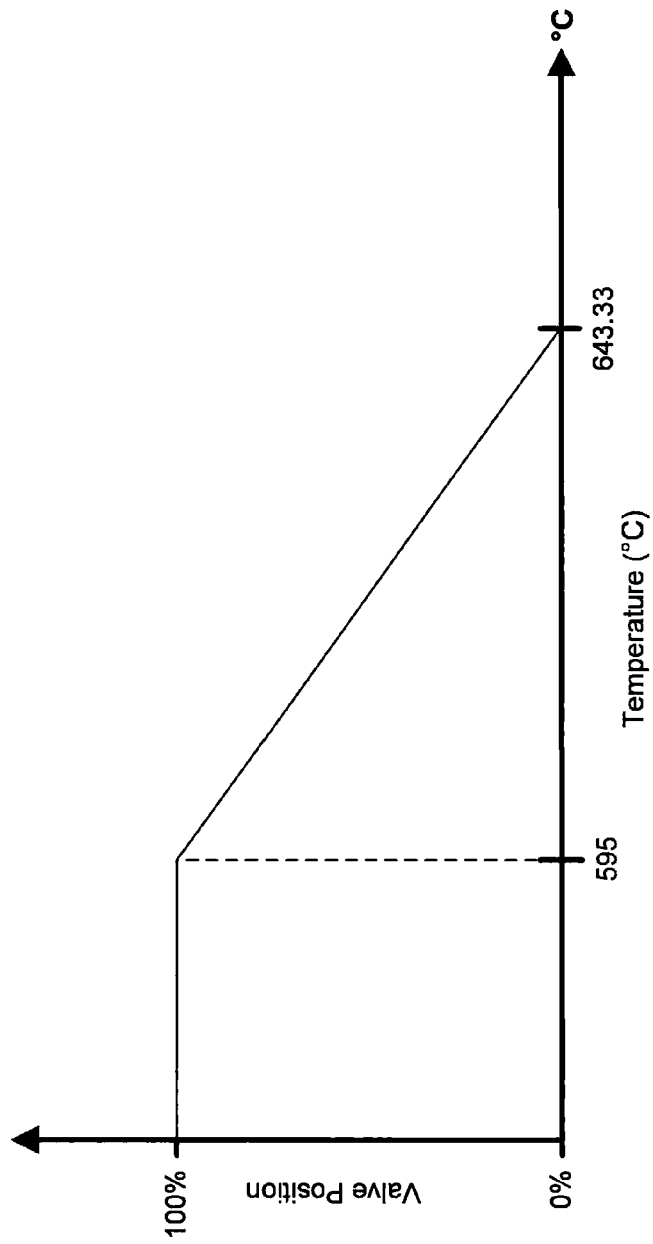
FIG. 2 is an exemplary functional map of provisional bleed valve command positions as a function of turbine exhaust outlet temperature, in accordance with the present disclosure.

For example, at step 503, controller 40 may determine the provisional bleed valve command position corresponding to the exhaust outlet temperature based on the determined value for exhaust outlet temperature and by referencing stored data indicative of the map in FIG. 2. FIG. 2 depicts an exemplary outlet exhaust temperature map for a SOLAR® Mercury 50 (M-50) GTE. According to this embodiment, the map provides the provisional bleed valve command position as a function of exhaust outlet temperature. Preferably, the exhaust outlet temperature is indicative of the temperature at the inlet to recuperator 19 (e.g., at the exhaust temperature sensor 35 location, whether measured, calculated, estimated and/or otherwise determined). Alternatively, the exhaust outlet temperature may be indicative of the temperature adjacent to turbine section 16 (e.g., at the exhaust temperature sensor 34 location, whether measured, calculated, estimated and/or otherwise determined). In the depicted embodiment, the provisional bleed valve command position is 100% (i.e., fully open) when the exhaust temperature is less than or equal to a first temperature threshold (e.g., 595° C.), and is 0% (i.e., fully closed) when the exhaust temperature is greater than or equal to a second temperature threshold (e.g., 643.33° C.). Other temperature thresholds may be used in additional embodiments. Similarly, in other embodiments, a partially open provisional bleed valve command position (e.g., 75%) may be provided when the exhaust outlet temperature is less than or equal to the first temperature threshold. Between the two temperature thresholds, the provisional command valve position may vary substantially linearly in accordance with the exhaust temperature. 643.33° C. is approximately five degrees Celsius lower than the exhaust outlet temperature limit during normal GTE operation. Near the exhaust outlet temperature limit for the GTE 10, the fuel control protocols of controller 40 may modulate, among other things, fuel input and the position of guide vanes, in order to maintain an appropriate working temperature. By utilizing a value five degrees Celsius lower than the exhaust outlet temperature limit as the temperature at which the provisional command position is 0% (i.e., closed), the bleed valve override schedule may effectively avoid interaction with (and feedback from) the fuel control algorithms. The specific temperature values may be adjusted for different GTE configurations.

Figure 3:
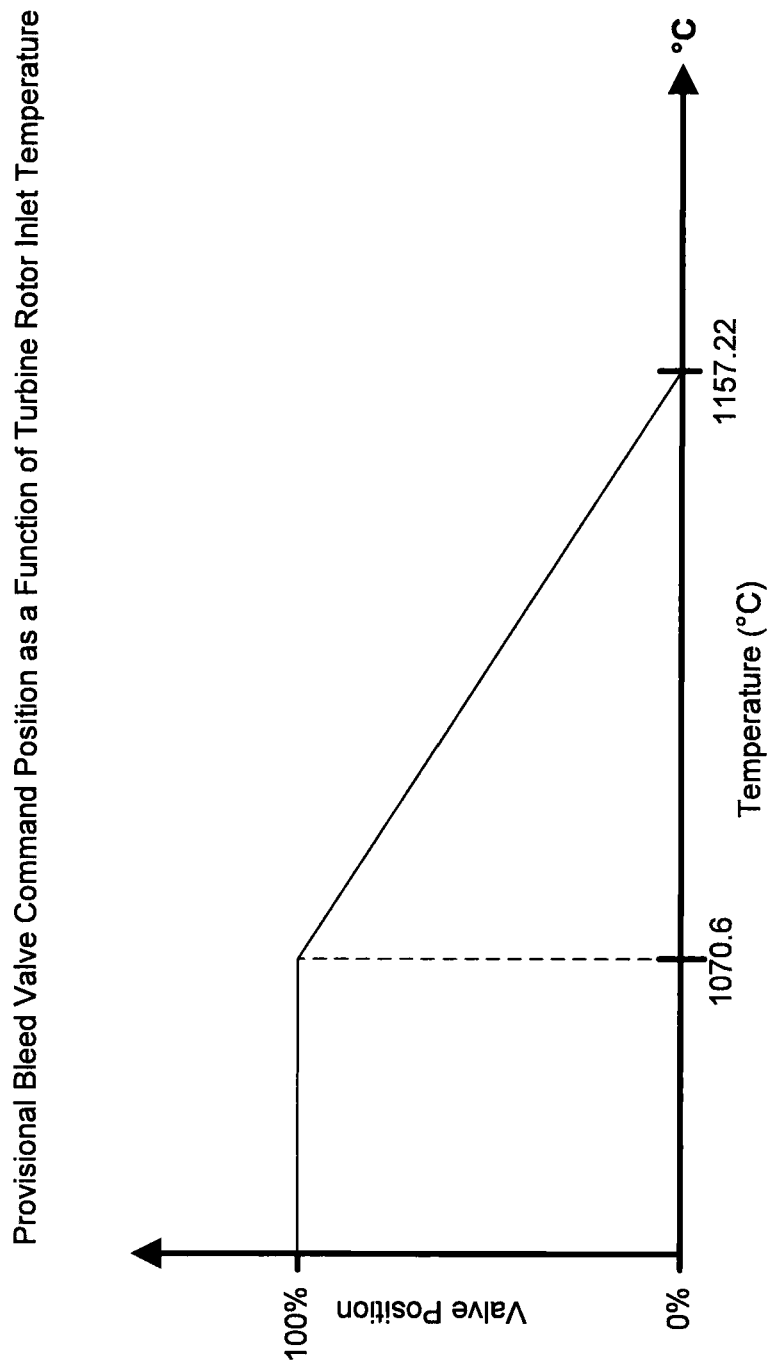
FIG. 3 is an exemplary functional map of provisional bleed valve command positions as a function of turbine rotor inlet temperature, in accordance with the present disclosure.

Also in step 503, controller 40 may determine the provisional bleed valve command position corresponding to the turbine rotor inlet temperature (TRIT) based on the determined value for TRIT and by referencing stored data indicative of the map in FIG. 3. FIG. 3 depicts an exemplary TRIT map for a SOLAR® Mercury 50 (M-50) GTE. According to an exemplary embodiment, the map provides the provisional bleed valve command position as a function of TRIT. Preferably, the TRIT is derived by taking an exhaust temperature measurement and adjusting the value based upon the pressure drop across the turbine section 16. In the depicted embodiment, the provisional valve command position is 100% (i.e., fully open) when the TRIT is less than or equal to a first temperature threshold (e.g., 1070.6° C.), and is 0% (i.e., fully closed) when the TRIT is greater than or equal to a second temperature threshold (e.g., 1157.22° C.). Other temperature thresholds may be used in additional embodiments. Similarly, in other embodiments, a partially open provisional bleed valve command position (e.g., 75%) may be provided when the TRIT is less than or equal to the first temperature threshold. Between the two temperature thresholds, the provisional bleed valve command position may vary substantially linearly in accordance with the turbine rotor inlet temperature. 1157.22° C. is approximately five degrees Celsius lower than the TRIT temperature limit during normal GTE operation. Near the TRIT temperature limit for the GTE 10, fuel control algorithms of controller 40 may modulate, among other things, fuel input and the position of guide vanes, in order to maintain an appropriate working temperature. By utilizing a value five degrees Celsius lower than the TRIT temperature limit as the temperature at which the provisional command position is 0% (i.e., closed), the bleed valve override schedule may effectively avoid interaction with (and feedback from) the fuel control algorithms. The specific temperature values may be adjusted for different GTE configurations.

Figure 4:
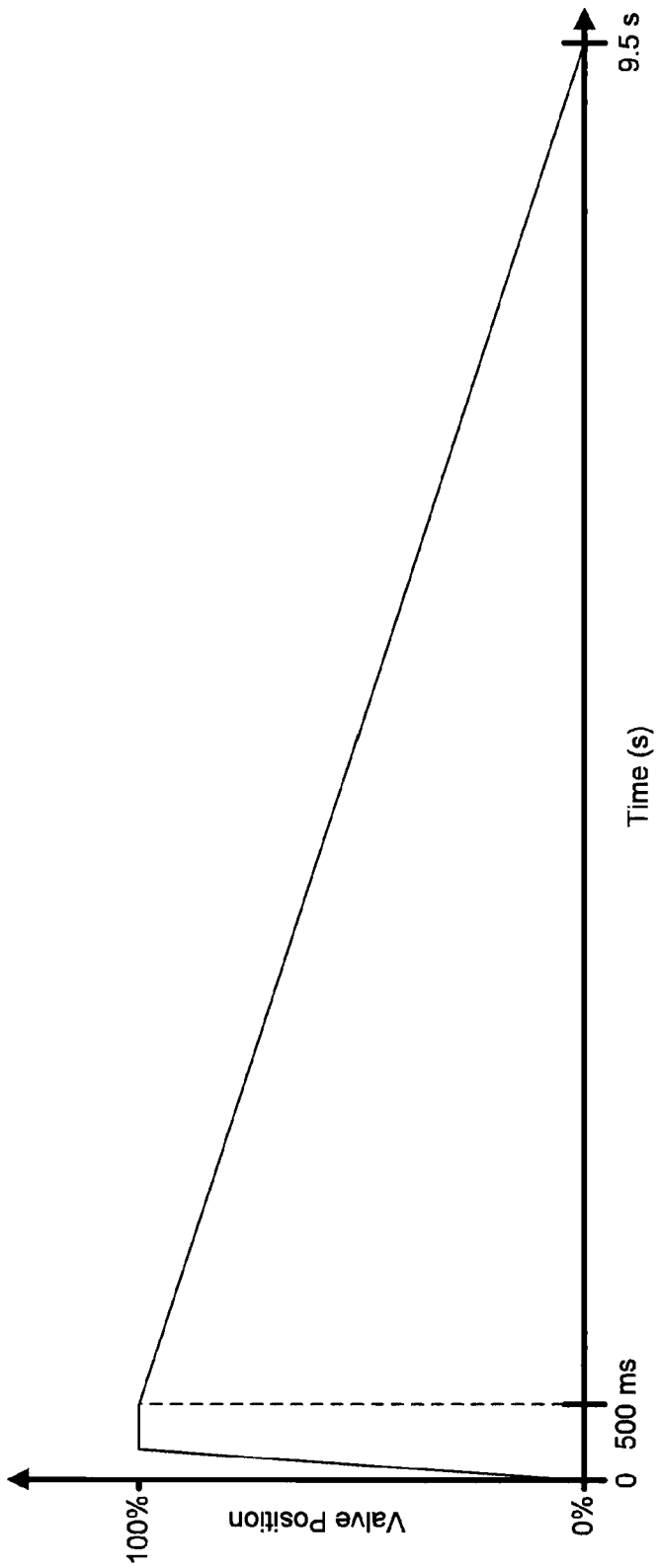
FIG. 4 is an exemplary functional map of provisional bleed valve command positions as a function of time elapsed since initiation of an off-load transient, in accordance with the present disclosure.

With continued reference to step 503, controller 40 may determine the provisional bleed valve command position corresponding to time elapsed based on the actual amount of time elapsed from the onset of an off-load transient and by referencing stored data indicative of the map in FIG. 4. FIG. 4 depicts an exemplary bleed valve override time map. According to an exemplary embodiment, the map provides the provisional bleed valve command position as a function of time since the override schedule began. In the depicted embodiment, the provisional valve command position begins at 0% (i.e., fully closed) and rapidly approaches 100% (i.e., fully open), which is maintained until 500 milliseconds. To reduce stress on bleed valve 15, the provisional valve command position as a function of time does not start at 100% in preferred embodiments, but rather is commanded to from 0% to 100% gradually over approximately 100 milliseconds. In other embodiments, the provisional valve command position may be a partially open position (e.g., 75%) when the time elapsed from the onset of the offload transient is between 100 milliseconds and 500 milliseconds. At that point, the provisional bleed valve command position may decrease substantially linearly until a 0% is reached at a maximum override time of 9.5 seconds. The specific time values may be adjusted for different GTE configurations.

In step 504, controller 40 may determine which of the provisional bleed valve positions determined in step 503 has the lowest relative value (i.e., corresponding to the most closed position for bleed valve 15). Controller 40 may then select this minimum bleed valve command position to be the selected bleed valve command position. In certain preferred embodiments, however, controller 40 may select the provisional bleed valve command position corresponding to time elapsed—regardless of the other two provisional bleed valve command positions—for an initial time period (e.g., the first 500 milliseconds) after the onset of the off-load transient. After that initial time period expires, controller 40 may then select the minimum of the three bleed valve command positions to be the selected bleed valve command position in step 504.

In step 505, bleed valve 15 is adjusted by controller 40 to reflect the selected bleed valve command position. Specifically, controller 40 may send a signal to bleed valve 15 directing the adjustment to the selected command position. The actual position bleed valve 15 may then conform to the selected bleed valve command position.

In step 506, controller 40 determines whether or not the bleed valve override schedule has been completed (i.e., when the amount of time elapsed reaches or exceeds maximum override time) or should be aborted (i.e., upon onset of an on-load transient). The bleed valve override schedule may be completed when the amount of time elapsed reaches or exceeds maximum override time (e.g., 9.5 seconds in an embodiment depicted in FIG. 4). In exemplary embodiments, an on-load transient may be defined as a substantial increase in power drain of, for example, more than 500 kW between scans of the load driven by the GTE 10, which may occur approximately every 30 milliseconds. If either the maximum override time is exceeded or an on-load transient is detected, the bleed valve override schedule is complete at step 507. If, however, the bleed valve override schedule has not been completed or aborted, it continues at step 502. In other words, the bleed valve override schedule may repeat steps 502-505 in a closed loop manner until either the on-load transient is detected or the time elapsed since onset of the off-load transient exceeds a maximum override time.

At step 507, the bleed valve override schedule has been completed. Controller 40 will operate the GTE 10 based on normal bleed valve control protocols. A normal bleed valve control protocol refers to methods known in the art by which a bleed valve position is selected by a controller 40 of a GTE 10. Often, during normal bleed valve control protocols, the controller 40 selects a fully closed position for the bleed valve 15 and the bleed valve 15 is adjusted to the fully closed position.

Figure 6:
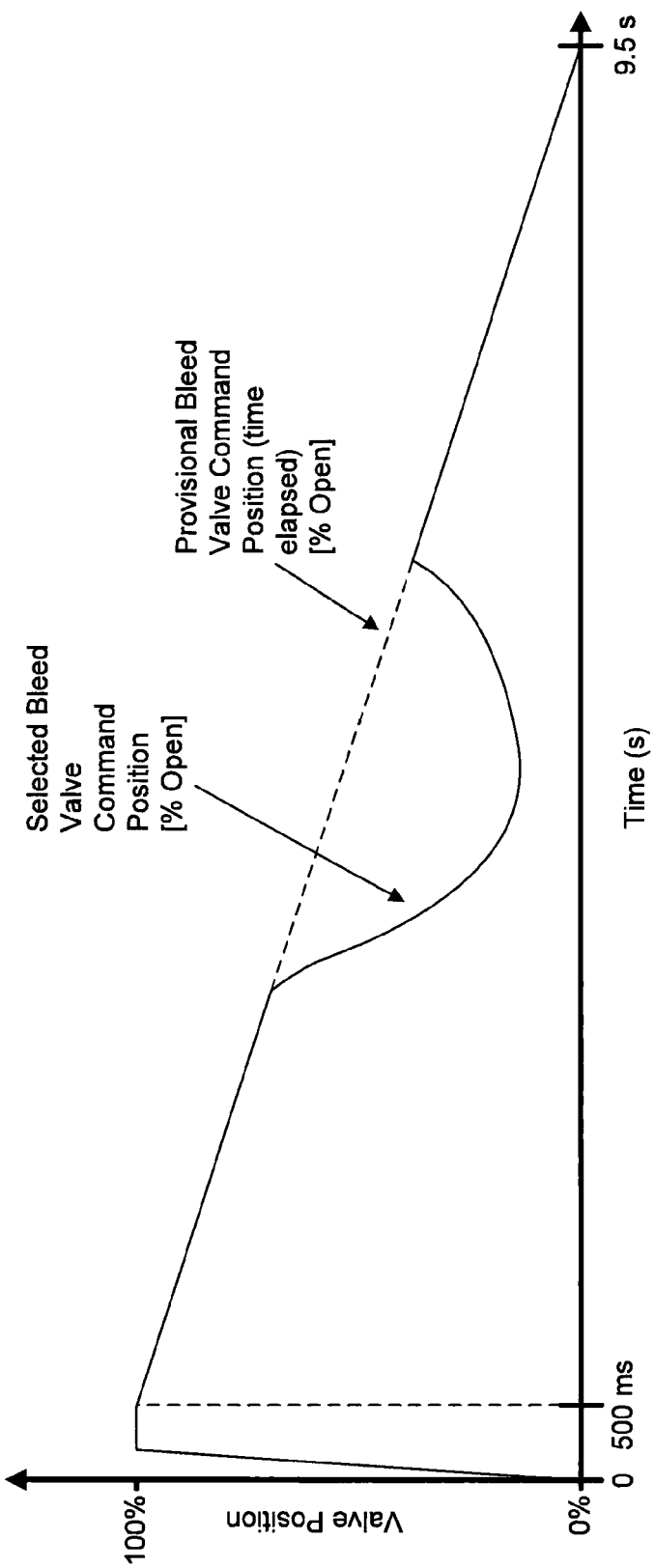
FIG. 6 illustrates an example of a relationship between selected bleed valve command position and time, in accordance with the present disclosure.

FIG. 6 is an example of selected bleed valve command positions as a function of time in accordance with the disclosed bleed valve override schedule. FIG. 6 depicts the position of bleed valve 15 resulting from onset of an off-load transient where controller 40 adjusts bleed valve 15 in accordance with the bleed valve override schedule described above. Further, where the selected bleed valve command position is reduced as a result of provisional bleed valve command positions based upon either the TRIT and/or the exhaust outlet temperature (i.e., at approximately 3.5 to 6 seconds), FIG. 6 shows the relatively larger value of the provisional bleed valve command position based on elapsed time as a dotted line.

It will be apparent to those skilled in the art that various modifications and variations can be made to the disclosed system without departing from the scope of the disclosure. Other embodiments of the present disclosure will be apparent to those skilled in the art from consideration of the specification and practice of the method and apparatus disclosed herein. It is intended that the specification and examples be considered as exemplary only, with a true scope of the disclosure being indicated by the following claims and their equivalents.

The invention claimed is:

1. A method for controlling a position of a bleed valve of a gas turbine engine, comprising:
   a) determining an onset of an off-load transient;
   b) determining a value representative of a turbine rotor inlet temperature, a value representative of an exhaust outlet temperature, and an amount of time elapsed since onset of the off-load transient;
   c) determining a first provisional bleed valve command position value based on the value representative of the turbine rotor inlet temperature;
   d) determining a second provisional bleed valve command position based on the value representative of the exhaust outlet temperature;
   e) determining a third provisional bleed valve command position based on the time elapsed since onset of the off-load transient;
   f) determining which of the first, second, and third provisional bleed valve command positions is associated with a lowest relative value and selecting the provisional bleed valve command position associated with the lowest relative value; and
   g) adjusting the position of the bleed valve to match the selected bleed valve command position.

2. The method of claim 1, further including, after an initial time period, performing steps b) though g), in a closed-loop manner, until either an on-load transient is detected or the time elapsed since onset of the off-load transient exceeds a maximum override time.

3. The method of claim 2, wherein determining an onset of the off-load transient further includes:
   monitoring a load driven by the gas turbine engine; and
   determining that a power drain of the load has dropped more than a threshold amount within a specific time frame.

4. The method of claim 2, further including detecting an on-load transient,
   wherein detecting the on-load transient includes:
   monitoring a load driven by the gas turbine engine; and
   determining that a power drain of the load has increased more than a threshold amount within a specific time frame.

5. The method of claim 4, further including:
   adjusting the position of the bleed valve to a fully closed position if the on-load transient is detected.

6. The method of claim 2, wherein determining the first provisional bleed valve command position based on the value representative of the turbine rotor inlet temperature further includes:
   correlating the value representative of the turbine rotor inlet temperature with stored data indicative of provisional command positions as a function of respective turbine rotor inlet temperatures.

7. The method of claim 6, wherein:
   when the value representative of the turbine rotor inlet temperature is less than a first temperature value, the first provisional bleed valve command position is at least partially open;
   when the value representative of the turbine rotor inlet temperature is greater than a second temperature value, the first provisional bleed valve command position is fully closed; and
   when the value representative of the turbine rotor inlet temperature is between the first and second temperature values, the first provisional bleed valve command position varies linearly from the first temperature value to the second temperature value.

8. The method of claim 2, wherein determining the second provisional bleed valve command position based on the value representative of the exhaust outlet temperature further includes:
   correlating the value representative of the exhaust outlet temperature with stored data that indicates provisional command positions as a function of respective exhaust outlet temperatures.

9. The method of claim 8, wherein:
when the value representative of an exhaust outlet temperature is less than a first temperature value, the second provisional bleed valve command position is at least partially open;
when the value representative of an exhaust outlet temperature is greater than a second temperature value, the second provisional bleed valve command position is fully closed; and
when the value representative of an exhaust outlet temperature is between the first and second temperature values, the second provisional bleed valve command position varies linearly from the first temperature value to the second temperature value.

10. The method of claim 2, wherein determining the third provisional bleed valve command position based on the time elapsed since onset of the off-load transient further includes:
correlating the time elapsed with stored data that indicates provisional command positions as a function of time elapsed since onset of the off-load transient.

11. The method of claim 10, wherein:
when approximately no time has elapsed since onset of the off-load transient, the third provisional bleed valve command position is fully closed;
when the time elapsed is between 0 seconds and a first time value, the third provisional bleed valve command position varies linearly from 0 seconds to the first time value;
when the time elapsed is between the first time value and a second time value, the third provisional bleed valve command position is at least partially open; and
when the time elapsed is between the second time value and the maximum override time, the third provisional bleed valve command position varies linearly from the second time value to the maximum override time.

12. The method of claim 1, wherein the value representative of an exhaust outlet temperature is indicative of the exhaust outlet temperature at a location along a turbine exhaust passage proximate to a turbine section and remote from a recuperator.

13. The method of claim 1, wherein the value representative of an exhaust outlet temperature is indicative of the exhaust outlet temperature at a location along a turbine exhaust passage proximate to a recuperator and remote from a turbine section.

14. A gas turbine engine control system, comprising:
a plurality of sensors configured to gather data relating to a turbine rotor inlet temperature of a turbine section of the engine and an exhaust outlet temperature of the turbine section;
a variable bleed valve configured to bleed compressed air; and
a controller in communication with the set of sensors and the bleed valve, the controller being configured to:
determine the onset of an off-load transient;
determine the onset of an on-load transient;
determine a time elapsed since onset of the off-load transient;
determine the turbine rotor inlet temperature;
determine the exhaust outlet temperature;
determine a first provisional command position for the bleed valve based on the turbine rotor inlet temperature;
determine a second provisional command position for the bleed valve based on the exhaust outlet temperature;
determine a third provisional command position for the bleed valve based on the time elapsed since onset of the off-load transient;
determine which of the first, second, and third provisional bleed valve command positions is associated with a lowest relative value;
select the provisional bleed valve command position associated with the lowest relative value; and
adjust a position of the bleed valve based on the selected provisional command position.

* * * * *